United States Patent Office 2,989,457
Patented June 20, 1961

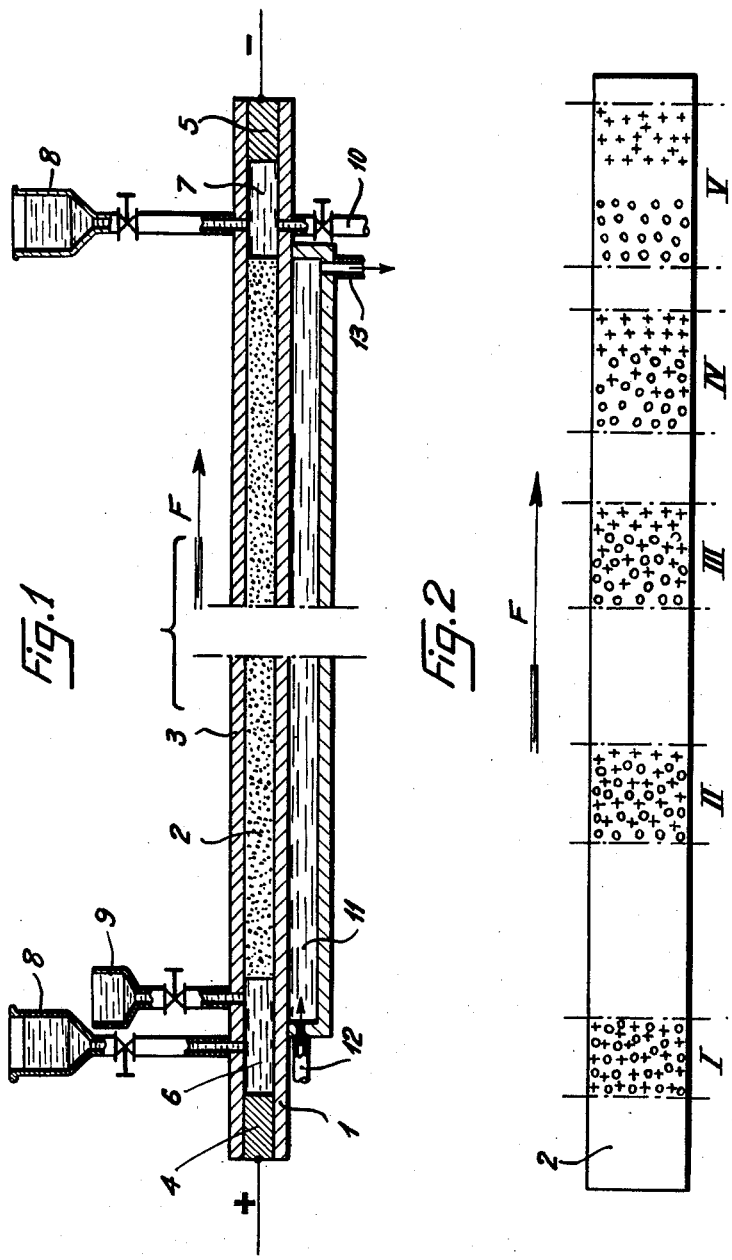

2,989,457
APPARATUS FOR THE SEPARATION OF ISOTOPES
Carel J. van Oss, 1 Place de l'Estrapade, and Norbert R. Beyrard-Benchemoul, 15–17 Ave. Paul Doumer, both of Paris, France; said Norbert R. Beyrard-Benchemoul now by change of name Norbert R. Beyrard
Filed Apr. 3, 1957, Ser. No. 650,445
Claims priority, application France Apr. 12, 1956
2 Claims. (Cl. 204—299)

This invention relates to means for the separation of particles having very similar chemical and physical properties, and more especially to the separation of isotopes. The term "particles" is used herein to denote material of extremely small dimensions, e.g., in the form in which the materials exist when in solution.

It is an object of the present invention to provide, in contrast to the known processes and apparatus already employed for effecting such a separation, more especially as they are used in the case of isotopes, an apparatus which utilizes only small quantities of energy and which does not involve installations of extremely large dimensions.

According to the present invention the procedure for the separation of isotopic particles comprises subjecting to a longitudinal electric field a long membranous band having the characteristics of a gel having intercommunicating pores, the average diameter of which is slightly larger than the average diameter of the largest particle to be separated, the said band being impregnated with a conductive solution (buffer solution), supplying periodically to one of the ends of the said band small quantities of a solution of the materials to be separated, and periodically extracting the solution with which the band is impregnated at the other end of the band.

It is known that the majority of gels have, by reason of their molecular constitution, an electric charge which, in an electric field, tends to move them as a whole towards one of the electrodes by which the said field is set up. However, if the gel is prevented from moving, it is the conductive solution with which it is impregnated that moves as a whole towards the opposite electrode. This phenomenon is known as electro-osmosis.

In a gel having pores the dimension of which are substantially as great as the dimensions of the particles, these pores are intercommunicating, are statistically of very similar dimensions and constitute canaliculi of small cross-section for the conductive solution. When particles of two different types are incorporated in the said conductive solution, the smaller particles will pass through the said canaliculi more readily than the larger particles. Consequently, when the particles have travelled a certain distance through the gel, there will be statistically produced a relatively greater advance of the particles of smaller dimensions over the particles of larger dimensions. In other words a more or less complete separation of the said particles is effected, as can be shown by examining the material extracted at the end of the path of travel, i.e. at the end of the band.

In an advantageous embodiment of the invention, the isotopic particles are supplied in the state of ions, so that the effect of electrophoresis due to the electric field combines with the effect of electro-osmosis in moving the said particles.

Furthermore, it is known that two ions having very similar characteristics, for example, two ions consisting of two different isotopes of the same substance, may have, in the form of a "solvate" in any solvent (in the hydrated form in aqueous medium), differences in dimensions which in the case of water probably conform to the structure of the dipoles of water which are associated therewith. In the presence of the obstacles formed by the pores, whose average diameter is only slightly larger than the average of the said solvated ions, this difference in dimensions provides a difference in mobility through the canaliculi which greatly contributes to the effect of separation produced by the invention.

This difference in the dimensions of the ions is, as is known, shown by "ion exchangers" which, with equal electric charges, adsorb the less hydrated ions slightly more readily by reason of the fact that the charge is to some extent more concentrated on a weakly hydrated ion than on a strongly hydrated ion. In particular, the difference in the dimensions of ions consisting of the different isotopes of the same substance has already been demonstrated in this way. It has thus been possible to observe that in general in the case of strongly hydrated ion, such as lithium, the heavier isotope is the more hydrated, while in the case of weakly hydrated ions, such as potassium, it is the lighter isotope which is the more hydrated.

Preferably, the nature of the gel, the nature of the ions and the direction of the current are so chosen that the electro-phoretic effect is added to the electro-osmotic effect for the conveyance of the particles to be separated from one end of the band to the other. The maximum possible speed of travel of the said particles in the band is thus obtained. A device in which this procedure is applied therefore comprises a long narrow band formed by a membrane having the character of a gel, means for impregnating the said band with a conductive solution (buffer solution) and maintaining this impregnation, two electrodes of opposite polarity at the ends of the said band and conductively connected thereto, means for periodically feeding small quantities of solution containing the particles to be separated to one of the ends of the band, and means for periodically extracting liquid from the other end of the band.

The description which follows with reference to the accompanying drawings, which are given solely by way of example, will serve to illustrate the invention.

FIGURE 1 shows diagrammatically a separating apparatus according to the invention substantially in longitudinal, vertical section, and FIGURE 2 is a diagrammatic representation of the process of separation.

Referring to the drawings, there is disposed on a long horizontal support 1, for example of glass, a thin narrow band of membrane 2, for example a band of regenerated cellulose or collodion.

This band is covered by a protective layer 3, for example a glass sheet or a solid paraffin coating, to prevent evaporation of the liquid with which the band is impregnated. A fluid-tight joint is provided along the edges of the band 2 between the protective layer 3 and the support 1.

Disposed at the ends of the band 2 are the electrodes 4 and 5, which close off fluid-tight compartments 6 and 7 provided at the ends of the band. A vessel 8 for the supply of buffer solution is connected to each of the said fluid-tight compartments. Thus, the membranous band is impregnated throughout with conductive liquid and the compartments 6 and 7 are filled with the said liquid, which ensures the conductive connection between the electrodes.

In order to save space, the band 2 instead of being straight may be disposed in zig-zag form or wound helically (flat or on edge, i.e. in the form of a helicoid), or spirally (also flat or on edge).

A vessel 9 of solution containing the isotopic particles to be separated is provided at one of the ends of the band and from it the said solution may be fed periodically into the compartment 6 adjacent electrode 4. At the other end of the band, a duct 10 is provided for periodically extracting liquid from the corresponding compartment 7.

Finally, in order to avoid increase in the temperature of the membrane due to the passage of electric current, cooling liquid may be circulated in contact with at least one of the walls enclosing the said membrane, for example in contact with the wall of the support 1.

Thus, in the embodiment illustrated, cold water may be circulated through the flat duct 11, the said water being introduced through the orifice 12 and discharged through the orifice 13.

If the membrane 2 consists, for example, of regenerated cellulose, the particles of which it is formed are negatively charged and, when subjected to the action of the electric field generated by the electrodes 4 and 5, the said membrane tends to move as a whole towards the positive electrode 4. However, since the said membrane is held fast, all the conductive liquid contained therein is caused to move in the direction of the arrow F, i.e., towards the negative electrode 5 (electro-osmosis).

If the particles to be separated are cations, they will also be displaced by electrophoresis in the direction of the arrow F.

Preferably, the buffer solution, i.e. that fed from the vessels 8, is a fairly dilute electrolyte, preferably of saline form. The dilution reduces the conductivity and thus affords the double advantage of reducing the dissipation of energy in the form of heat in the diaphragm and of promoting the electro-osmotic effect.

The concentration of this conductive solution may be, for example, between decinormal and millinormal. On the other hand, the solution containing the particles to be separated has a concentration at least equal and preferably not more than ten times greater than the concentration of the buffer solution. The concentration may be, for example, between normal and centinormal value respectively.

The nature of the buffer solution may be arbitrary provided that the solvents of the buffer and added solutions are miscible and that the solutions do not coprecipitate.

The concentrations of the solutions are not critical, the electro-osmosis effect being promoted with diluted solutions while electro-phoresis plays the leading part with more concentrated solutions.

A cellulose membrane, for example, has pores of a diameter of from 15 to 25 A. or, if this cellulose membrane is swelled with zinc chloride, of the order of from 20 to 40 A. Such pores constitute obstacles, the resistance of which is fairly substantially different in the case of types of particles or ions having similar dimensions of the order of from 5 to 10 A., as is the case, for example, with uranium or uranyl ions. The smaller particles pass through the pores substantially more readily than the larger particles.

To determine the optimum nature of the gel to be used, that is to say, the dimension of the pores of the said gel, it is possible to add to a solution containing at least one of the particles to be separated, both particles of distinctly smaller size and particles of distinctly larger size. Thus, where the separation of uranium or uranyl ions is to be undertaken, it is possible to add to the solution thorium ions which, by reason of their high degree of hydration, are distinctly coarser, and potassium ions, which are distinctly smaller by reason of their univalence and their weak hydration.

The dimension of the pores will be regarded as appropriate if an experiment for determining the conveyance by electro-osmosis and electro-phoresis carried out in this gel over a short distance results in the total conveyance of the smaller ions, a substantially negligible conveyance of the larger ions and a conveyance between about 40% and 60% of the ions to be separated.

The speed of conveyance in such a membrane by the combined effects of electro-phoresis and electro-osmosis is of the order of a few centimetres per hour in an electric field of the order of 10 volts per centimetre. If a membrane of a length of ten metres is employed, it will be necessary to use for creating such a field a potential difference between the electrodes of the order of 10,000 volts, and consequently the duration of the travel of the ions from one end of the membrane to the other will be of the order of about 150 hours.

However, at the end of this travel, the very slight difference in the speed of movement between the ions of one type and those of the other type (difference resulting from the filtering effect of the canaliculi) will have produced an advance of one type over the other type, so that these ions originally introduced in the form of a mixture will be separate at the end of their travel.

FIGURE 2 is a rough illustration of this process of separation.

At the beginning of the path of movement, there is introduced into the membrane from the vessel 9 a quantity of liquid containing a uniform mixture of, for example, two types of ions illustrated at I by circles and crosses respectively.

At the end of one hour, for example, this dose has reached II, i.e. has travelled for example through a distance of the order of one tenth of a centimetre. At II, the ions marked by crosses, which will be assumed to be those less impeded, are already commencing to separate from the ions marked with circles. The area occupied on the membrane by the applied solution has spread and some separation between the ions is already commencing to appear. A further quantity can then be introduced at I.

As they progress in the direction of the arrow F, the successive quantities take up the appearances shown at III and IV, that is, the separation between the ions of the two categories is accentuated as far as V, towards the end of the path of travel, where substantially all the ions marked by crosses have acquired an appreciable lead over the ions marked with circles and are consequently separated therefrom.

Two successive extractions effected with an interval of half an hour through the discharge duct 10 permit of successively collecting the ions of the two types. If the separation is incomplete, the extracts obtained at 10 may be returned into the cycle at 9 for a further separating operation.

Thus, the same separating apparatus permits of simultaneously treating many quantities of products to be separated which are spaced and separated along the band. In order to avoid any further mixing, the spacing between two consecutive doses at the start must obviously be made greater than the spread of one dose at the end of the path of travel.

In the diagrammatic example illustrated in FIGURE 2, it has been assumed that the particles to be separated were in equal proportions in the mixture, but obviously the method is applicable to the case where these proportions are not equal.

The extractions effected at 10 for each of the constituents of the mixture may obviously be proportional to the relative quantity of the two constituents to be separated when either of these constituents reaches the said extraction channel.

The same apparatus obviously permits of separating a mixture containing more than two constituents, the extraction then being effected at a rate three, four or more times higher than the rate at which the quantities to be separated are introduced.

For automatic operation, the introduction of quantities of material at 9 and the extractions at 10 may be arranged on a time schedule, the extraction times being a function of the rate of introduction.

When one type of ions is radioactive, the travel of this type of ions may be followed along the band by use of a Geiger-counter.

In all cases, the rate of admission and extraction, and the optimum length of the band may be experimentally determined. Experimental bands are used with a given rhythm of admission and with different duration of the electric field application, then these bands are removed from the apparatus and transversely cut; the pieces are analysed, for example, by use of a mass spectrograph. Thus the place and the moment of effective separation and consequently the timing of admission and extraction may be accurately determined.

We claim:

1. An apparatus for separation of solvated isotopic ions in solution, said ions being of the group consisting of uranium ions and uranyl ions, comprising, an elongated membranous band of a substance selected from the group consisting of regenerated cellulose and collodion, said band having intercommunicating pores having pore sizes with relative differences in the range from between 10 A. to 20 A., the average size of which is slightly larger than the average size of the largest of said ions to be separated, said band being impregnated with a conductive buffer solution, means for maintaining said impregnation, two energized electrodes of opposite polarities at the end of said band and conductively connected thereto, means for periodically feeding small quantities of solution containing said isotopic ions to the end of the band electrically connected to the electrode having the same polarity of said ions, and means for periodically extracting liquid from the other end of the band.

2. An apparatus for separation of solvated isotopic ions in solution, said ions being of the group consisting of uranium ions and uranyl ions, comprising, an elongated band of regenerated cellulose swelled with zinc chloride, said band having intercommunicating pores having pore sizes with relative differences in the range from between 10 A. to 20 A., the average size of which is slightly larger than the average size of the largest of said ions to be separated, said band being impregnated with a conductive buffer solution, means for maintaining said impregnation, two energized electrodes of opposite polarities at the end of said band and conductively connected thereto, means for periodically feeding small quantities of solution containing said isotopic ions to the end of the band electrically connected to the electrode having the same polarity of said ions, and means for periodically extracting liquid from the other end of the band.

References Cited in the file of this patent

UNITED STATES PATENTS 2,678,300    Sturtevant _____ May 11, 1954
2,813,064    Clark _____ Nov. 12, 1957

OTHER REFERENCES

Science, vol. 67, No. 1728, Feb. 10, 1928, pp. 163–167.